(12) United States Patent
Huang et al.

(10) Patent No.: US 9,497,104 B2
(45) Date of Patent: Nov. 15, 2016

(54) DYNAMIC UPDATE OF ROUTING METRIC FOR USE IN ROUTING RETURN TRAFFIC IN FHRP ENVIRONMENT

(71) Applicant: CISCO TECHNOLOGY, INC., San Jose, CA (US)

(72) Inventors: Yi Huang, RTP, NC (US); Che-ming Chang, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 160 days.

(21) Appl. No.: 14/155,109

(22) Filed: Jan. 14, 2014

(65) Prior Publication Data

US 2015/0200839 A1    Jul. 16, 2015

(51) Int. Cl.
| | | |
|---|---|---|
| G01R 31/08 | (2006.01) | |
| H04L 12/751 | (2013.01) | |
| H04L 12/46 | (2006.01) | |
| H04L 12/66 | (2006.01) | |
| H04L 12/24 | (2006.01) | |
| H04L 12/64 | (2006.01) | |

(52) U.S. Cl.
CPC ............ *H04L 45/02* (2013.01); *H04L 12/4641* (2013.01); *H04L 12/6418* (2013.01); *H04L 12/66* (2013.01); *H04L 41/0654* (2013.01)

(58) Field of Classification Search
CPC ................. H04L 45/02; H04L 12/4641; H04L 12/6418; H04L 41/0654; H04L 12/66; H04L 12/751; H04L 12/24; H04L 12/46

USPC ................................................ 370/230–236.2
See application file for complete search history.

(56) References Cited

U.S. PATENT DOCUMENTS

| | | | |
|---|---|---|---|
| 5,936,936 A * | 8/1999 | Alexander, Jr. ..... | H04Q 11/0478 370/216 |
| 7,859,992 B2 * | 12/2010 | Buchko ................. | H04L 45/00 370/216 |
| 7,881,188 B2 | 2/2011 | Li et al. | |
| 8,472,311 B2 | 6/2013 | Rodgers et al. | |
| 2006/0133298 A1* | 6/2006 | Ng et al. ........................ | 370/254 |
| 2007/0121486 A1* | 5/2007 | Guichard ................ | H04L 45/02 370/216 |
| 2010/0189117 A1* | 7/2010 | Gowda et al. .......... | H04L 12/66 370/401 |
| 2013/0044757 A1 | 2/2013 | Rai et al. | |
| 2013/0094357 A1* | 4/2013 | Sankar et al. ................. | 370/230 |

* cited by examiner

*Primary Examiner* — Mang Yeung
(74) *Attorney, Agent, or Firm* — Cindy Kaplan

(57) ABSTRACT

In one embodiment, a method includes identifying an active traffic flow at a first FHRP (First Hop Redundancy Protocol) network device, the first FHRP network device associated with a second FHRP network device operating in a standby mode for the traffic flow, automatically setting a routing metric for the traffic flow based on an active state at the first FHRP network device, advertising the routing metric, and receiving a return traffic flow at the first FHRP network device based on the routing metric. An apparatus and logic are also disclosed herein.

20 Claims, 4 Drawing Sheets

DYNAMIC UPDATE OF ROUTING METRIC FOR USE IN ROUTING RETURN TRAFFIC IN FHRP ENVIRONMENT

TECHNICAL FIELD

The present disclosure relates generally to communication networks, and more particularly, to routing return traffic.

BACKGROUND

A network may include a collection of gateways used to forward packets towards (and receive packets from) destinations outside of the network. The gateways may be configured to provide redundancy using a First Hop Redundancy Protocol (FHRP).

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
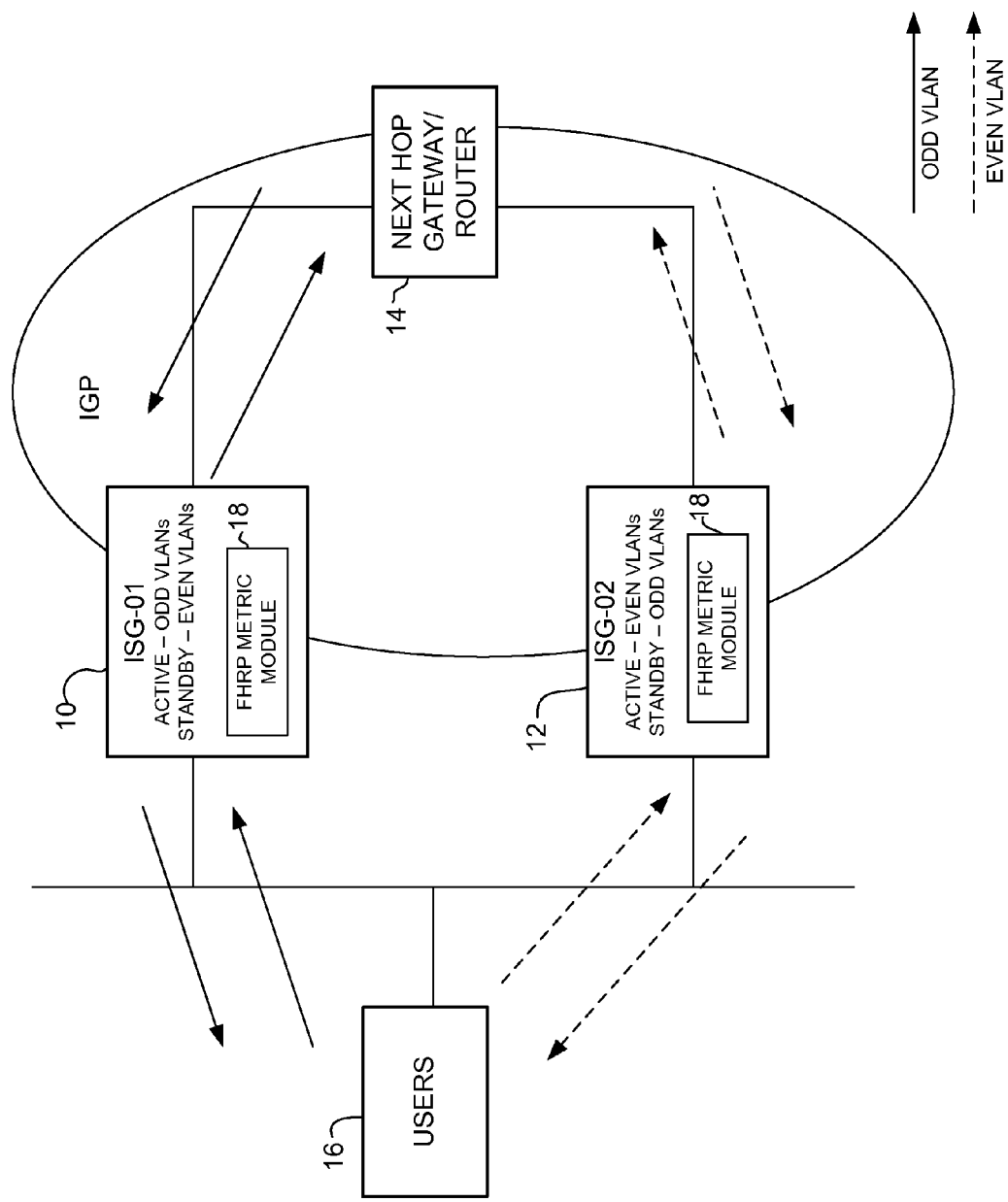
FIG. 1 illustrates an example of a network in which embodiments described herein may be implemented.

In one embodiment, a method generally comprises identifying an active traffic flow at a first FHRP (First Hop Redundancy Protocol) network device, the first FHRP network device associated with a second FHRP network device operating in a standby mode for the traffic flow, automatically setting a routing metric for the traffic flow based on an active state at the first FHRP network device, advertising the routing metric, and receiving a return traffic flow at the first FHRP network device based on the routing metric.

In another embodiment, an apparatus generally comprises a processor for identifying an active traffic flow at a first FHRP (First Hop Redundancy Protocol) network device, the first FHRP network device associated with a second FHRP network device operating in a standby mode for the traffic flow, automatically setting a routing metric for the traffic flow based on an active state at the first FHRP network device, advertising the routing metric, and receiving return traffic flow based on the routing metric. The apparatus further comprises memory for storing the routing metric.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In networks that deploy FHRP (First Hop Redundancy Protocol) to provide first hop gateway redundancy, it is desired for the return traffic to be routed through the active FHRP router. Asymmetric routing may cause communication problems when packets pass through different stateful features. In conventional systems, in order to influence the routing decision for the return traffic by a next hop gateway, complicated route-maps are constructed. The route-map may need to be constantly adjusted to accommodate any addition, deletion, or changes of active VLANs. Even with the complex route-map, it is often difficult to eliminate a traffic black hole, which occurs when a router is not able to forward traffic and communications end at the router. For example, use of route-maps does not eliminate traffic loss in failure scenarios.

Certain embodiments described herein use FHRP knowledge on active and standby (backup) routers to dynamically and automatically adjust a routing metric to influence selection of the routing path for return traffic by a next hop router. Adjustment of the routing metric is dynamically coupled to the FHRP state, which may allow for additional functionality, as described in detail below. One or more embodiments may be used in any situation where it is desirable or necessary to route return traffic via an active FHRP router. In one embodiment, the FHRP routers use their knowledge about active FHRP VLANs to automatically assign a lower metric for the active VLANs and influence the routing path used for return traffic. One or more embodiments may eliminate the need to construct complex route-maps to manually influence the routing decision.

Referring now to the drawings, and first to FIG. 1, an example of a network in which embodiments described herein may be implemented is shown. For simplification, only a small number of nodes are shown. FIG. 1 illustrates two network devices (gateways, routers) 10, 12 in communication with a next hop gateway (router) 14 and users (user devices) 16. The users 16 may comprise any number of network devices (e.g., endpoints, mobile devices, wired devices, hosts, etc.). The routers 10, 12 communicate with the gateway 14 and users 16 over one or more networks. The network may include any number of edge devices in communication with any number of intermediate or core nodes (e.g., routers, switches, or other network devices), which facilitate passage of data within the network. There may also be any number or type of network devices located in the network paths between the gateways 10, 12 and users 16. The gateways 10, 12 may be in communication with any number of networks (e.g., local area network, metropolitan area network, wide area network, virtual private network, data center, enterprise network, Internet, intranet, radio access network, public switched network, or any other network).

Each gateway 10, 12 is configured to operate according to an FHRP, such as HSRP (Hot Standby Router Protocol), VRRP (Virtual Router Redundancy Protocol), GLBP (Gateway Load Balancing Protocol), or any other FHRP. It is to be understood that references herein to an FHRP such as HSRP are only provided as an example and that other FHRPs may be used, without departing from the scope of the embodiments.

In one example (e.g., Service Provider WiFi environment), user sessions and traffic policy are enforced on an Intelligent Service Gateway (ISG) 10, 12. ISGs are often deployed in a pair via FHRP in an active/standby configuration to provide first hop gateway redundancy. Each ISG 10, 12 may operate in an active mode for some traffic and standby mode for other traffic. For example, in order to achieve traffic load-balancing, one ISG in the pair may be active for some VLANs while the other ISG is active for other VLANs.

In the example shown in FIG. 1, gateway 10 (ISG-01) operates as an active HSRP (active mode) for odd VLANs (e.g., 10.101.0.x/24 (101, 103, 105, etc.)) and a standby HSRP (standby mode, backup mode) for even VLANs (e.g., 10.102.0.x/24 (100, 102, 104, etc.)), while router 12 (ISG-02) operates as an active HSRP for even VLANs and standby HSRP for odd VLANs.

Since a user session is only created on the ISG that is the active FHRP, it is important that return traffic is routed back via the same FHRP ISG, otherwise traffic may be dropped. As described in detail below, knowledge in FHRP of active and standby VLANs and role changes (e.g., when active peer is unresponsive) are used to dynamically set a routing metric (at FHRP metric module 18) to influence the routing decision by the next hop gateway 14.

The access side networks (e.g., users 16) are redistributed into an IGP (Interior Gateway Protocol) (e.g., OSPF (Open Shortest Path First) or other IGP) to advertise their reachability. A change in the metric may be propagated to other routers using OSPF or other IGP, for example.

It is to be understood that the network shown in FIG. 1 and described herein is only an example and that the embodiments may be implemented in networks having different network topologies and network devices, without departing from the scope of the embodiments.

Figure 2:
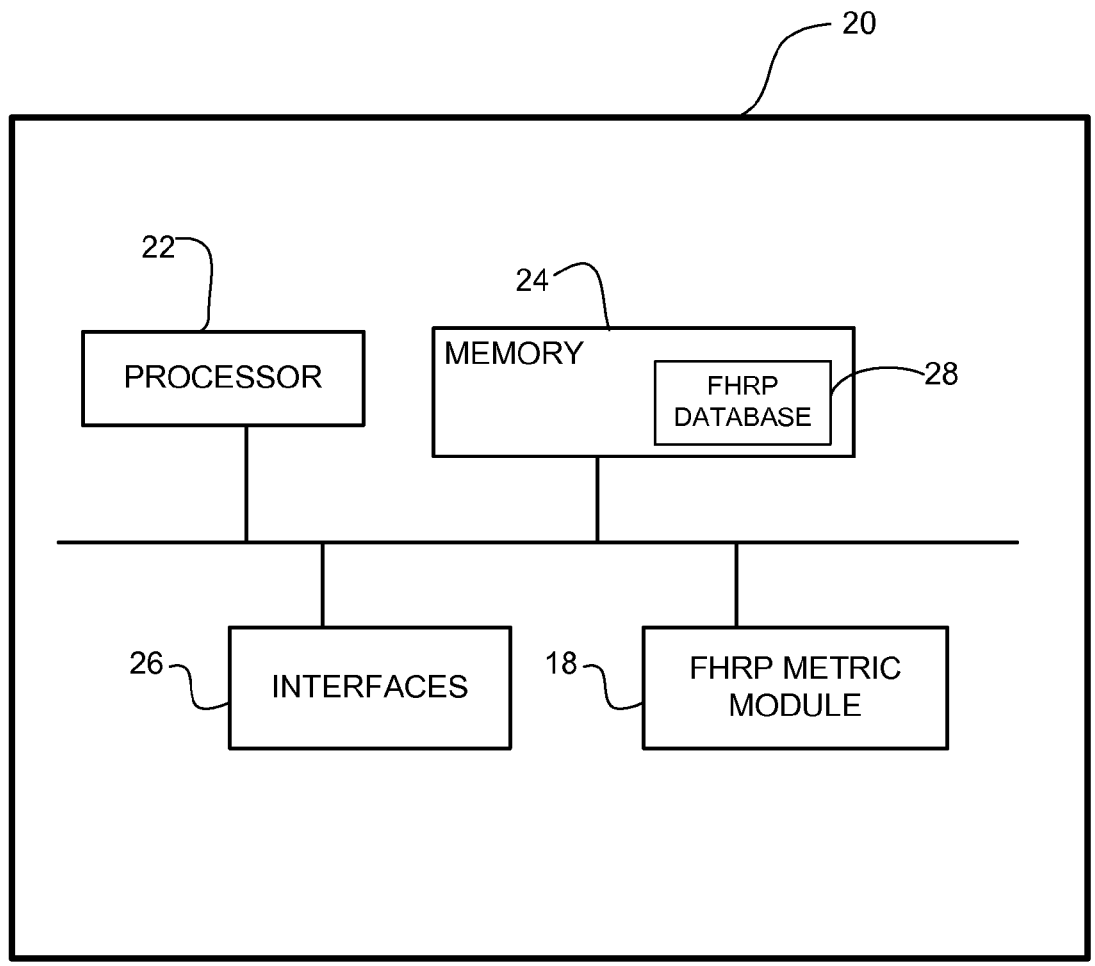
FIG. 2 depicts an example of a network device useful in implementing embodiments described herein.

An example of a network device 20 (e.g., gateway, router 10, 12 in FIG. 1) that may be used to implement embodiments described herein is shown in FIG. 2. In one embodiment, network device 20 is a programmable machine that may be implemented using any suitable combination of hardware, firmware, and software. The device 20 includes one or more processor 22, memory 24, network interfaces 26, and FHRP metric module 18. As described below, FHRP metric module 18 may be used to automatically adjust a routing metric based on FHRP state to influence the routing path of return traffic from gateway 14 to users 16 and prevent asymmetrical routing.

Memory 24 may be a volatile memory or non-volatile storage, which stores various applications, modules, and data for execution and use by the processor 22. For example, memory 24 may include an FHRP database 28 (e.g., table or any other type of data structure) for storing FHRP data. Memory 24 may also include one or more components (e.g., logic, code) of FHRP metric module 18. Memory 24 may comprise any number and type of storage components.

Logic may be encoded in one or more tangible computer readable media for execution by the processor 22. For example, the processor 22 may execute codes stored in a computer readable medium such as memory 24. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. Logic may be embodied as software stored on a non-transitory, tangible media operable to perform functions when executed by the processor 22.

The network interfaces 26 may comprise any number of interfaces (linecards, ports) for receiving data or transmitting data to other devices. The interface 26 may include, for example, an Ethernet interface for connection to a computer or network.

It is to be understood that the network device 20 shown in FIG. 2 and described above is only an example and that network devices having different components and configurations may be used without departing from the scope of the embodiments. For example, the network device 20 may further include any suitable combination of hardware, software, algorithms, processors, devices, components, modules, or elements operable to facilitate the capabilities described herein.

Referring again to FIG. 1, in one example, the next hop gateway 14 has two equal cost paths for the return traffic via either ISG-01 or ISG-02. It is nondeterministic for the return path (depends on the type or routing protocol, whether multiple paths is enabled, etc.).

In order to return the odd VLANs traffic via ISG-01 and even VLANs traffic via ISG-02, the route metric needs to be adjusted on ISG-01 and ISG-02. ISG-01 advertises a lower metric for odd VLANs and ISG-02 advertises a lower metric for even VLANs.

When ISG-01 fails, all traffic falls over to ISG-02. When ISG-01 comes back up, it takes back the active role so that the load balancing is once again achieved. If ISG-01 preempts too early before IGP convergence, then traffic is black holed. If ISG-01 preempts too late after IGP convergence, then the next hop gateway will route return traffic via ISG-01 for odd VLANs as it has a lower metric. Asymmetrical routing would exist if west to east odd VLAN traffic flowed through ISG-02 (as FHRP preemption has not taken place and ISG-02 is still active) and return traffic flowed through ISG-01. Traffic would be lost on ISG-01 as the user session is not present there.

In one or more embodiments, FHRP carries the knowledge of active and standby VLANs and also dynamically detects role changes when the active peer is unresponsive. This knowledge can be used to dynamically set the routing metric to influence the routing decision by the next hop gateway 14 to deter traffic loss or asymmetric routing.

Figure 3:
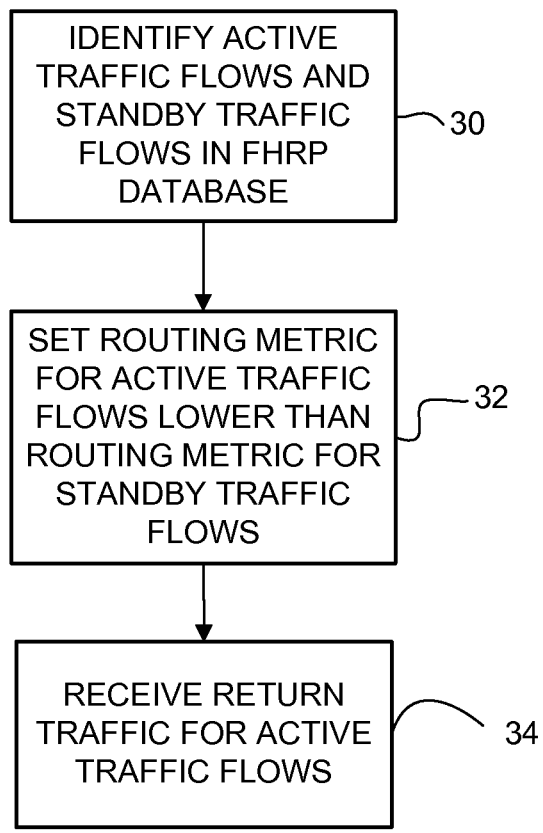
FIG. 3 is a flowchart illustrating an overview of a process for setting a routing metric to influence routing path selection for return traffic, in accordance with one embodiment.

FIG. 3 is a flowchart illustrating on overview of a process for dynamically updating a routing metric for use in routing return traffic, in accordance with one embodiment. In one embodiment, the FHRP database 28 may be scanned periodically (e.g., every three minutes) to identify active and standby traffic flows (e.g., VLANs) (step 30). The embodiments may use a pull model, a push model, or both push and pull. With the pull model where the FHRP database is scanned at a certain interval (e.g., three minutes), traffic loss may still be experienced before the next scan. With the push model, whenever there is a change in the FHRP database, there is a notification (step 30). For all active traffic flows the routing metric is automatically adjusted to a lower value (e.g., set to be minus 50 from its allocated (configured) metric value (e.g., OSPF value)), and for all standby traffic flows the metric is automatically adjusted to a higher value (e.g., set to be plus 50 from its allocated metric value) (step 32). Thus, the routing metric for active traffic flows is set lower than the routing metric for standby traffic flows. The metric is dynamically adjusted as needed (e.g., for changes in VLANs or gateway operation (e.g., failure of one of the gateways 10, 12)). The return traffic flows via the active FHRP router (step 34). The routing decision for the return traffic is based at least in part on the routing metric.

Figure 4:
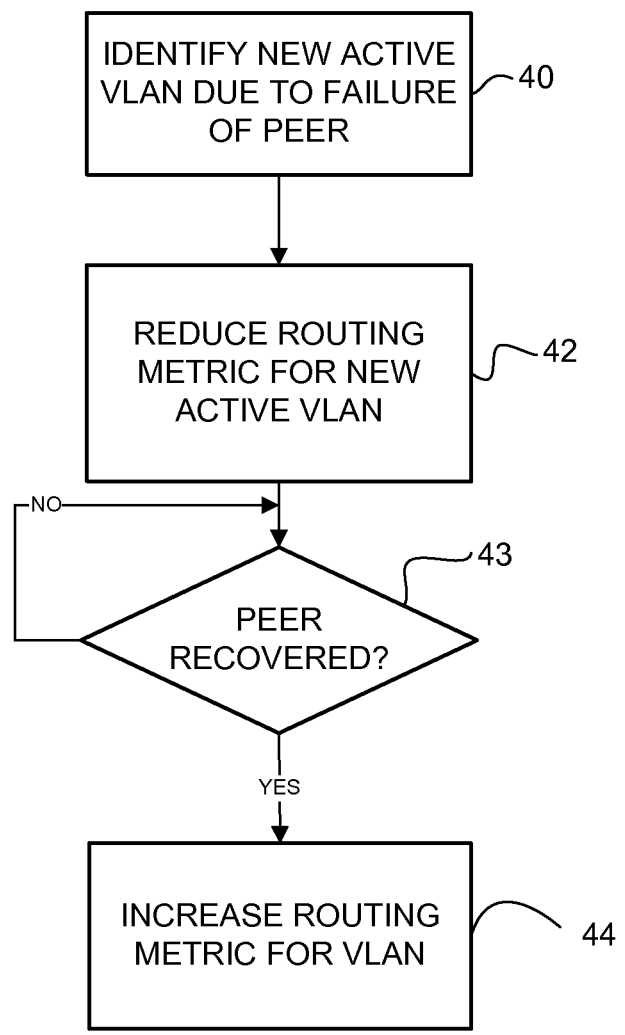
FIG. 4 is a flowchart illustrating an overview of a process for adjusting the routing metric following a failure at a gateway, in accordance with one embodiment.

FIG. 4 is a flowchart illustrating an overview of a process for adjusting the routing metric to influence the routing path decision for return traffic following a failure in one of the gateways 10, 12, in accordance with one embodiment. At step 40, the gateway identifies one or more new active VLANs (traffic flows) due a failure at the peer gateway. The FHRP metric module 18 reduces the routing metric for the new active VLAN (step 42). Once the peer recovers (step 43), the routing metric for the VLAN is increased so that the gateway once again operates as standby for that VLAN (step 44). As described in the example below, the routing metric is reduced at the recovered gateway after a delay to prevent the loss of traffic.

It is to be understood that the processes illustrated in FIGS. 3 and 4 and described above are only examples and that steps may be modified, added, or combined, without departing from the scope of the embodiments.

The following provides an example illustrating how traffic loss is minimized for the failure scenario described above with respect to FIG. 4. In this example, ISG-01 is active for odd VLANs and standby for even VLANs. ISG-02 is active for even VLANs and standby for odd VLANs (FIG. 1), and HSRP is used to track the core bound interface line protocol.

ISG-01 (HSRP active for odd VLANs) fails and ISG-02 becomes active for odd VLANs. All ISG-01 traffic falls over to ISG-02. ISG-02 sets a lower metric for both odd and even VLANs automatically since it is now the active router for all VLANs (odd and even). In one embodiment, ISG-02 injects the route with a known lower metric than failed ISG-01 had advertised. User sessions are triggered and created on ISG-02 by the south to north (user to core) traffic.

When ISG-01 comes back online, ISG-01 should preempt and take back the active role so that load balancing is once again achieved. If ISG-01 preempts too early before IGP convergence, then traffic may be black holed. In one embodiment, a delay is set (e.g., 120 seconds) to give enough time for IGP to converge. The convergence time varies depending on the load, scale, etc. In this example, IGP converges at 40 seconds. Since HSRP preemption has not yet happened, IGP does not set a lower metric for odd VLANs on ISG-01 as ISG-01 is still the standby router. Symmetrical routing is provided for user to core and the return traffic via ISG-02.

In this example, HSRP preemption happens at 120 seconds. ISG-01 becomes active for odd VLANs. ISG-01 automatically advertises a lower metric and ISG-02 (now standby on odd VLANs) advertises a higher metric. ISG-01 is preferred for return traffic. Symmetrical routing is achieved and traffic loss is avoided.

In one embodiment, when the ISG comes back online, it may automatically detect if there is already an FHRP node running. If not, then the ISG recovers as quickly as possible. For example, if there is no other FHRP detected, it will return the metric to normal (configuration) value and the interface is included in the routing protocol.

In one embodiment, when the router is recovering, the FHRP interface route may not be injected into the routing table. For example, when a router recovers or brings up interfaces with FHRP enabled, it starts FHRP with minimum priority and the interface is not included in the routing protocols. Once the routing protocols have recovered, then the FHRP priority is increased so that the router one again becomes the primary router.

In one example, an 'hsrp-aware' option is used to associate the HSRP state with the routing metric dynamically and automatically. The gateway 10, 12 uses the information in the HSRP database 28 and assigns a lower metric for active HSRP VLANs. The following is an example configuration:

router ospf 100
    router-id 192.168.100.2
    redistribute connected subnets hsrp-aware
    bfd all-interfaces As noted above, with the coupling of FHRP and the routing protocol, additional functionalities may be provided. The following are examples using the HSRP state and IGP convergence.

When the active HSRP node fails and the standby node takes over the active role, the traffic is routed through the new active node as quickly as possible. Rather than waiting for the old route to be withdrawn in the routing table, the standby node may inject a lower metric (e.g., active metric minus 10) for all of the access networks/VLANs (IEEE 802.1Q) that it had just taken over the active role for a period of time. Other nodes prefer the new lower metric path and traffic is quickly routed through the new node, providing improved network convergence.

In one or more embodiments, the access networks/VLANs are only injected when the node is ready to handle traffic. When the HSRP state is not in the active or standby state (such as init and speaking), the node will not inject the access networks/VLANs into the IGP.

In one or more embodiments, the HSRP active role is only claimed when the IGP has converged. A route may be tracked and the HSRP priority adjusted to determine when the node takes over the active HSRP role. However, the route may change and sometimes it is not plausible to find a common route to track. The embodiments allow the node to be aware of IGP convergence and decide to claim the HSRP active role only after IGP has converged.

As can be observed from the foregoing, certain embodiments may provide one or more advantages. For example, in one or more embodiments, there is no need to configure or maintain a complex route-map, EEM (Embedded Event Manager), or PBR (Policy Based Routing). The routing metric is automatically set to a lower value for the active FHRP VLANs so that the path through the device is a preferred path. When VLANs are added, removed, or modified, the metric for those VLANs are automatically adjusted. Certain embodiments are scalable (can be applied to large networks) and minimize traffic loss.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   identifying an active traffic flow received at a first FHRP (First Hop Redundancy Protocol) network device, said first FHRP network device associated with a second FHRP network device operating in a standby mode for said active traffic flow;
   transmitting said active traffic flow to a next hop router;
   automatically setting a routing metric for said traffic flow based on an active state at said first FHRP network device;
   advertising said routing metric to influence selection of a routing path for a return traffic flow associated with said active traffic flow at the next hop router; and
   receiving said return traffic flow from the next hop router at said first FHRP network device based on said routing metric.

2. The method of claim 1 wherein said traffic flow is associated with a VLAN (Virtual Local Area Network).

3. The method of claim 1 wherein setting said routing metric for said active traffic flow comprises reducing a configured value for said routing metric.

4. The method of claim 1 wherein said first FHRP network device is in said standby mode for a second traffic flow and further comprising setting a second routing metric for said second traffic flow higher than said routing metric for said active traffic flow at said first FHRP network device.

5. The method of claim 4 further comprising identifying a failure at said second FHRP network device and automatically reducing said second routing metric to direct return traffic for said second traffic flow to said first FHRP network device.

6. The method of claim 5 wherein reducing said second routing metric comprises reducing said second routing metric below a value set by said second FHRP network device.

7. The method of claim 1 further comprising identifying an IGP (Interior Gateway Protocol) convergence for a second traffic flow and operating said first FHRP network device in an active mode for said second traffic flow after said IGP convergence.

8. The method of claim 1 further comprising said first FHRP network device going offline and coming back online, and reducing said routing metric for said active flow after a specified time delay.

9. The method of claim 1 wherein advertising said routing metric comprises advertising using an IGP (Interior Gateway Protocol).

10. An apparatus comprising:
a processor for identifying an active traffic flow at a first FHRP (First Hop Redundancy Protocol) network device, said first FHRP network device associated with a second FHRP network device operating in a standby mode for said active traffic flow, transmitting said active traffic flow to a next hop router, automatically setting a routing metric for said traffic flow based on an active state at said first FHRP network device, advertising said routing metric to influence selection of a routing path for a return traffic flow associated with said active traffic flow at the next hop router, and receiving said return traffic flow from the next hop router based on said routing metric; and
memory for storing said routing metric.

11. The apparatus of claim 10 wherein said traffic flow is associated with a VLAN (Virtual Local Area Network).

12. The apparatus of claim 10 wherein said routing metric is set below a configured value for said routing metric.

13. The apparatus of claim 10 wherein said first FHRP network device is configured for operating in said standby mode for a second traffic flow and wherein the processor is further operable to set a second routing metric for said second traffic flow higher than said routing metric for said active traffic flow at said first FHRP network device.

14. The apparatus of claim 13 wherein the processor is further operable to identify a failure at said second FHRP network device and automatically reduce said second routing metric to direct return traffic for said second traffic flow to said first FHRP network device.

15. The apparatus of claim 14 wherein reducing said second routing metric comprises reducing said second routing metric below a value set by said second FHRP network device.

16. The apparatus of claim 10 wherein the processor is further operable to identify an IGP (Interior Gateway Protocol) convergence for a second traffic flow and operate in an active mode for said second traffic flow after said IGP convergence.

17. The apparatus of claim 10 wherein the processor is further operable to bring said FHRP network device offline and back online, and reduce said routing metric for said active flow after a specified time delay.

18. The apparatus of claim 10 wherein said routing metric is advertised using an IGP (Interior Gateway Protocol).

19. Logic encoded on one or more non-transitory computer readable media for execution and when executed operable to:
identify an active traffic flow at a first FHRP (First Hop Redundancy Protocol) network device, said first FHRP network device associated with a second FHRP network device operating in a standby mode for said active traffic flow;
transmit said active traffic flow to a next hop router;
automatically set a routing metric for said traffic flow based on an active state at said first FHRP network device;
advertise said routing metric to influence selection of a routing path for a return traffic flow associated with said active traffic flow at the next hop router; and
receive the return traffic flow from the next hop router at said first FHRP network device, a routing decision for said return traffic flow based on said routing metric.

20. The logic of claim 19 further operable to reduce a configured value for said routing metric to set said routing metric.

* * * * *